United States Patent [19]

Ziegelmeyer

[11] Patent Number: 5,065,658
[45] Date of Patent: Nov. 19, 1991

[54] CUTTER LINK

[76] Inventor: Lynn J. Ziegelmeyer, P.O. Box 1112, Medford, Oreg. 97501

[21] Appl. No.: 542,096

[22] Filed: Jun. 22, 1990

[51] Int. Cl.⁵ .............................................. B27B 33/14
[52] U.S. Cl. .......................................... 83/834; 83/830
[58] Field of Search .................................. 83/830–834

[56] References Cited

U.S. PATENT DOCUMENTS

| 2,508,784 | 5/1950 | Cox | 83/834 |
|---|---|---|---|
| 2,744,548 | 5/1956 | Stephenson et al. | 83/834 |
| 3,144,891 | 8/1964 | Carlton | 83/834 |
| 3,261,385 | 7/1966 | Cooper | 83/834 |
| 3,469,610 | 9/1969 | Silvon | 83/831 |
| 3,727,507 | 4/1973 | Weiss | 83/831 |
| 4,104,793 | 8/1978 | Simington | 30/139 |
| 4,227,987 | 6/1981 | Hyde | 76/25 A |
| 4,254,673 | 3/1981 | Simington | 76/25 A |
| 4,463,630 | 8/1984 | Turner | 76/25 A |
| 4,535,667 | 8/1985 | Gibson | 83/830 |
| 4,625,610 | 12/1986 | Petrovich | 83/834 |

Primary Examiner—Mark Rosenbaum
Assistant Examiner—Eugenia A. Jones
Attorney, Agent, or Firm—Kolisch, Hartwell, Dickinson, McCormack & Heuser

[57] ABSTRACT

A cutter link where the top plate and the side plate of the cutter in the link join through an inclined transition region, and a planar bevel surface produces a cutting edge which extends along the top plate and through the transition region.

5 Claims, 2 Drawing Sheets

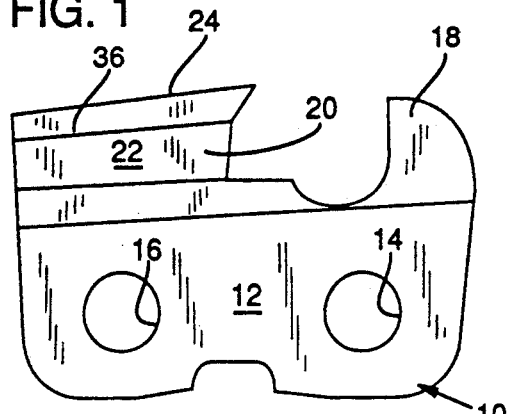
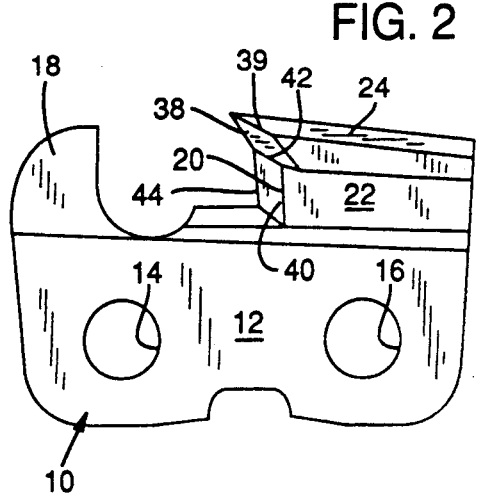
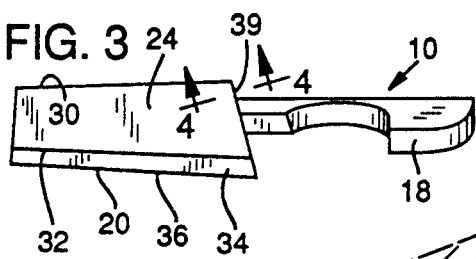
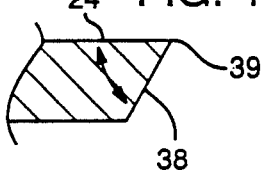
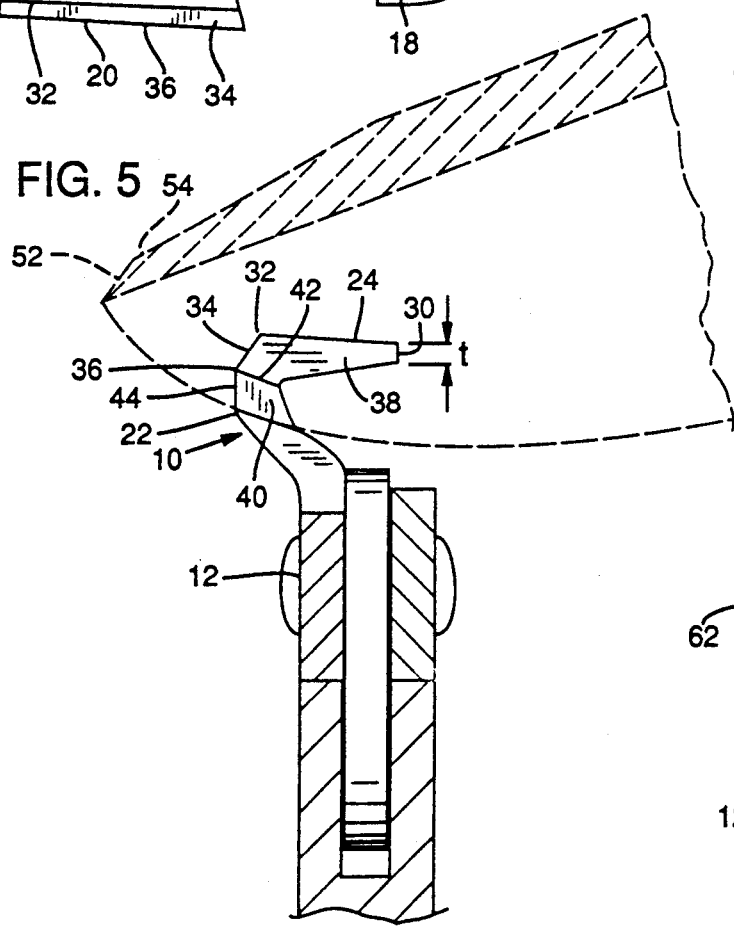

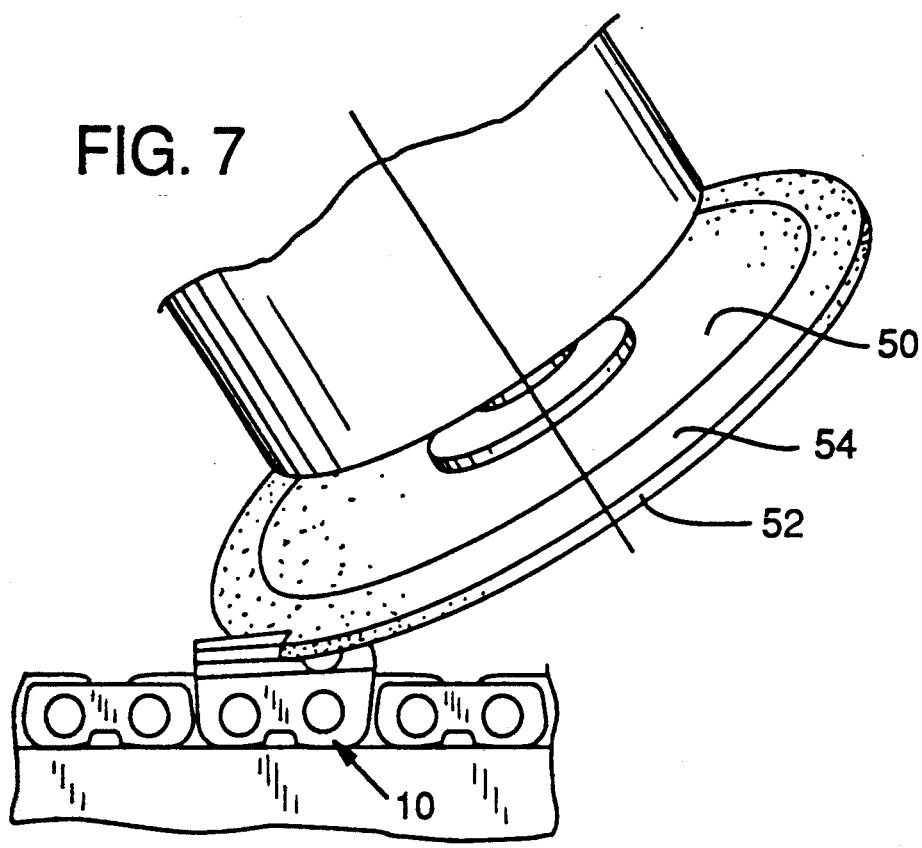
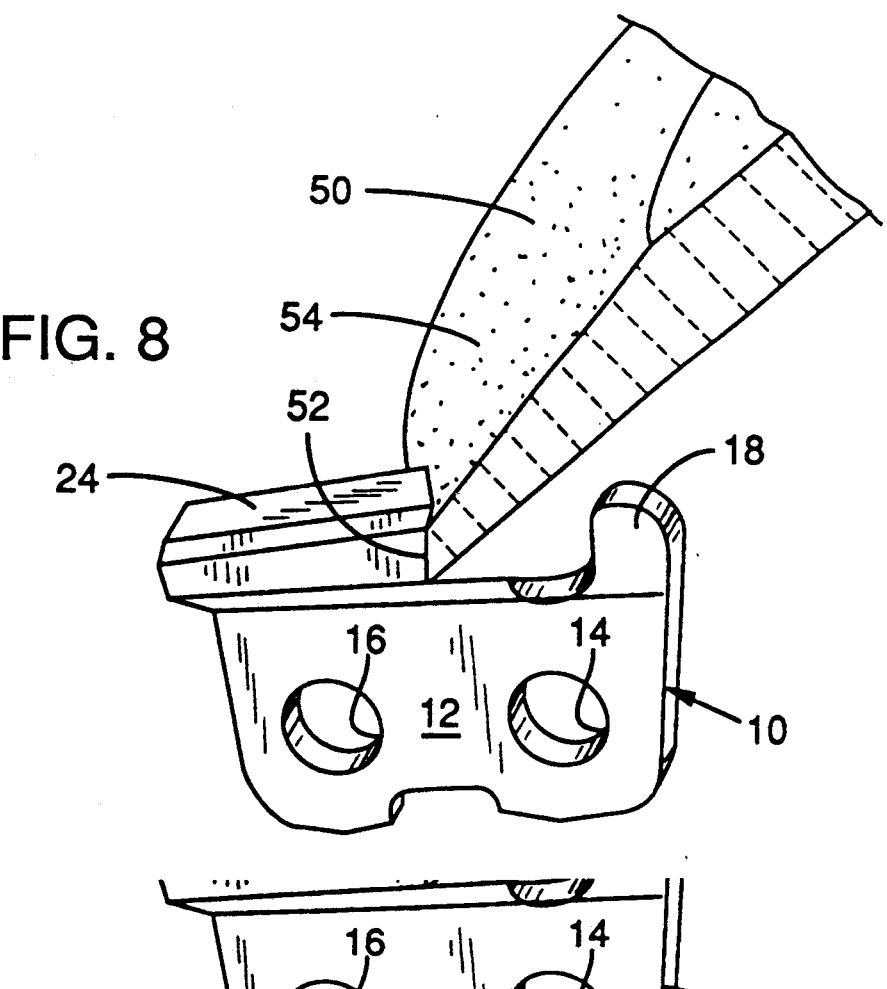

CUTTER LINK

This invention relates to saw chain such as is found in mechanical harvesters and powered chain saws used in the cutting of timber and other material. More particularly, the invention concerns a new construction for a cutter link in such saw chains.

The usual cutter link includes a body portion with bores for receiving the rivets that hold a chain together adjacent opposite ends of the body portion. Projecting up from the body portion and integral therewith at the front of the link is a depth gauge. Rearwardly of this depth gauge and spaced therefrom and projecting up from the rear of the body portion is a cutter which produces the actual cutting action of the saw chain.

One type of cutter link found in so-called chisel chain includes a substantially flat top plate forming the top of the cutter and with a sharpened forward edge. In cutting a saw kerf, the top plate bites into the wood as the link advances with a chiseling away of material. A side plate in the cutter extending from the top plate to the body portion of the link joins with the top plate at a sharp angle. The side plate has a sharpened forward edge and cuts the side of the saw kerf. The sharp angle at which the side plate and top plate meet produces a sharp penetration point in the cutter with newly sharpened chain. However, this portion of the chain, by reason of the heavy work that the portion is called upon to perform, tends to dull more rapidly that other parts of the cutter. This is a disadvantage, for instance, with mechanical tree harvesters, where the saw chain used must perform over long hours without grinding care.

Other types of cutter links known are the cutter links in so-called chipper chain and so-called semi-chisel chains. Any top plate in these cutter links joins with a side plate over a transition region, where the cutter either curves or slopes to join the top plate and the side plate, and with the absence of a sharp angle. Such links are traditionally sharpened by preparing a beveled edge which curves in this transition region. Such might be performed, for instance, by utilizing a round file in the sharpening operation. This, however, tends to produce a relatively thin cutting edge which is subject to early dulling.

A general object of this invention is to provide a new type of cutter link which, like the cutter found in chipper or semi-chisel chains, includes a transition region extending from the top plate to the side plate, and where the sharpened edge formed at the forward end of the top plate is produced by a unique configuration of a bevel surface producing an aggressive cutting action with an edge that will retain its sharpness over a long period of time.

More specifically, this invention contemplates an essentially planar bevel surface forming the cutting edge of the cutter in the link which extends continuously along the forward end of the top plate portion in the cutter outwardly to reach a zone in the side plate which is of maximum lateral extension in the link. This surface, therefore, forms the cutting edge in the transition region of the link. A cutting edge is provided on the side plate which, on the inside of the link, joins at a sharp angle with the cutting edge extending along the top plate. This accounts for an aggressive side cut for a substantial portion of the length of the side plate.

These and other objects and advantages are attained by the invention, which is described hereinbelow in conjunction with the accompanying drawings, wherein:

FIG. 1 is a side elevation viewing one side of a cutter link as contemplated;

FIG. 2 is a side elevation viewing the opposite side of the link;

FIG. 3 is a top view looking down at the link;

FIG. 4 is a cross-sectional view, taken generally along the line 4—4 in FIG. 3;

FIG. 5 is a view looking at the front of the link;

FIG. 6 illustrates a modified form of link; and

FIG. 7 and 8 show how a link may be sharpened.

Referring to the drawings, a cutter link as contemplated by the invention is illustrated in FIGS. 1 through 5 and given the reference numeral 10. The cutter link includes a body portion 12 extending along the bottom of the link. Adjacent forward and rear ends of this body portion are holes 14, 16 which receive the rivets connecting the link to other links in the saw chain. Integral with the body portion and projecting upwardly from the forward end of the body portion is a depth gauge 18. Also integral with the body portion and projecting upwardly from a rear part of the body portion is what is referred to herein as a cutter 20.

The cutter includes a side plate 22 and a top plate 24. The link when cutting a saw kerf moves with the depth gauge leading the cutter. The side plate is on the right side of the link viewing the link from the rear and toward the direction of travel of the link. The top plate extends from the side plate toward the left side of the link. Such a link sometimes is referred to in the art as a right-hand cutter link.

The usual saw chain as illustrated in U.S. Pat. No. 2,508,784, U.S. Pat. No. 4,353,277, and U.S. Pat. No. 4,425,830, includes left- and right-hand cutter links interspersed with each other and following one another along the length of a saw chain. A left-hand cutter link is symmetrically the same but opposite to a right-hand link, which is to say that the side plate is on the left side of the link and the top plate extends from this left side toward the opposite side. It should be understood that a saw chain incorporating a cutter link as described herein would, in addition to including left- and right-hand cutter links, include drive links forming the center of the saw chain following one another along the length of the chain. A cutter link and a tie-strap link opposite the cutter link joined by rivets to adjacent ends of drive links interconnect the drive links. Other side links such as additional tie-strap links interconnect the drive links where no cutter links are present.

The cutter link illustrated is what is referred to as a semi-chisel chain, in that the top plate 24 does not meet at a sharp angle with the side plate of the cutter. Instead, the top plate joins with a portion of the cutter which extends in a transition region, where the cutter inclines downwardly while further extending outwardly. On reaching a zone of maximum lateral extension, the cutter extends downwardly and thence inwardly to join the body portion.

Further explaining, the top plate portion has a terminal edge extending longitudinally of the cutter shown at 30. Progressing from this terminal edge the top plate is essentially flat until reaching the line shown at 32 in FIG. 3. The terminal edge has a given thickness "t".

At line 32 which is the start of the transition region, the cutter slopes downwardly while advancing laterally outwardly. This transition region is shown at 34. The transition region on reaching shoulder 36 reaches a zone of maximum lateral extension.

From this zone of maximum lateral extension, the side plate portion 22 extends downwardly and then slopes inwardly to join with the body portion of the cutter.

In the usual cutter, the transition region will have a width equaling or usually exceeding the thickness of the top plate at the terminal edge 30, i.e., thickness "t" earlier described.

Describing now the cutting edges in the cutter, the cutter is ground with an essentially planar bevel surface 38. Where this surface intersects the top surface of the top plate a cutting edge 39 is formed. The planar bevel surface extends entirely across the top plate and on the outside of the cutter terminates at shoulder 36 or at the zone of maximum lateral extension reached by transition region 34. Looking down at the cutter as shown in FIG. 3, the cutting edge formed by the intersection of this planar surface with the top surface of the top plate might extend along an angle which is 20 to 30 degrees from a plane normal to the longitudinal axis of the cutter link. The plane of the bevel surface extends at an angle ranging from 50 to 60 degrees with respect to the plane of the top surface of the top plate portion, as seen in FIG. 4. This means that the cutting edge is defined by intersecting surfaces of substantial relative slope and will retain its sharpness to a substantially greater degree than where there is a so-called thin cutting edge present.

The side plate is ground with another essentially flat surface 40. Along its upper extremity, this intersects with surface 38 along the line 42. Looking at the front of the link, as seen in FIG. 5, line 42 inclines at an angle of from 10 to 20 degrees from horizontal. This surface 40 intersects the outer surface of the side plate and extends from shoulder 36 downwardly along a substantial portion of the side plate. A substantially straight cutting edge 44 is formed producing an aggressive cutting action in that part of the side plate which functions to cut the side of a saw kerf. Edge 44, viewing the cutter link from one side, as in FIG. 1, optimally extends downwardly either vertically, or at a slight rearwardly inclined angle with respect to a vertical, at an angle of 0° to 10° (as shown).

A cutter as described may be ground to sharpen it utilizing a grinding wheel as illustrated in FIGS. 5 and 6. Thus, the grinding wheel 50 includes a circumferential edge surface 52 which meets at an obtuse angle with an inclined surface 54. Surface 54 is employed to grind bevel surface 38, whereas surface 52 is employed to grind intersecting surface 40. With movement of the position of the grinding wheel with respect to the chain, the angle of edge 39 relative to the longitudinal axis of the link can be changed. With the chain essentially directly under the lowest part of the grinding wheel, this angle lessens, whereas movement in the opposite direction is effective to increase this angle.

In FIG. 6 there is shown in cross-section a so-called chipper chain. In this configuration, the so-called transition region 60 extends as a continuously curving expanse from the top plate portion to the zone of maximum lateral extension shown at 62. Following the invention, a planar bevel surface 64 provides the cutting edge extending along the forward portion of the top plate and continuing to the zone of maximum lateral extension. Surface 66 in the side plate portion of the link produces a cutting edge where such intersects with the outer surface of the side plate portion.

While variations of the invention have been discussed, other modifications and variations are possible.

It is claimed and desired to secure by Letters Patent:

1. In a cutter link for saw chain where the link has a body portion and the body portion has a forward end and a rear end, a depth gauge projecting upwardly from the forward end of the body portion and a cutter joined to and projecting up from the rear end of the body portion, the cutter including a side plate and a top plate joining with the side plate and the top plate having a terminal edge extending the length of the top plate, the improvement comprising:

a top plate that in cross-section has an essentially flat extend adjacent the terminal edge and a given thickness at the terminal edge, the side plate in cross-section having a transition region where it inclines downwardly and outwardly from its joinder with the top plate to reach a zone of maximum lateral extension and the side plate then extending downwardly to join with the body portion, said transition region having a width which is greater than said given thickness, an essentially planar bevel surface forming the forward edge of the cutter tooth and extending from the zone of maximum lateral extend to said terminal edge and an additional surface joining with said beveled surface forming the forward edge of the cutter tooth in the side plate.

2. The cutter link of claim 1, wherein said additional surface is an essentially planar surface and said bevel surface and said additional surface intersect along a line which inclines downwardly progressing laterally inwardly from said zone of maximum lateral extent.

3. The cutter link of claim 2, wherein said line of intersection as viewed looking toward the front of the link inclines at an angle of from 10 to 20 degrees with respect to horizontal plane.

4. The cutter link of claim 1, wherein said side plate in said transition region extends as a continuous curve.

5. The cutter link of claim 1, wherein a major portion of said side plate in said transition region extends substantially as a straight expanse.

* * * * *